C. C. CAREK.
ANTIFRICTION DEVICE FOR LEAF SPRINGS.
APPLICATION FILED MAR. 30, 1921.
1,396,251. Patented Nov. 8, 1921.
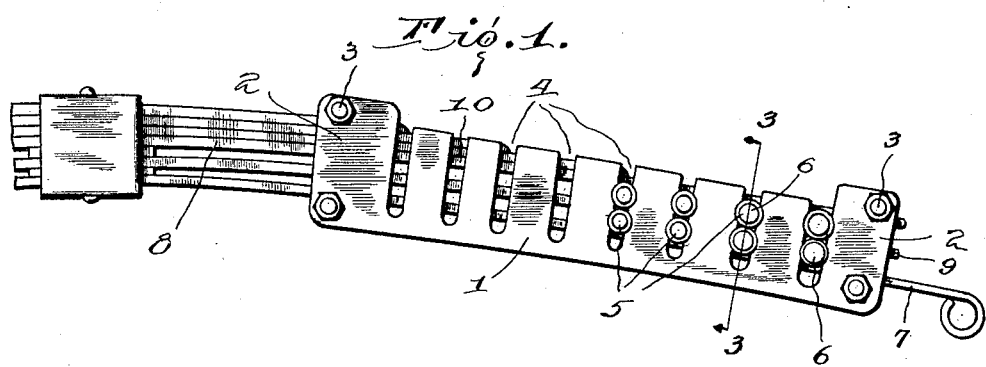
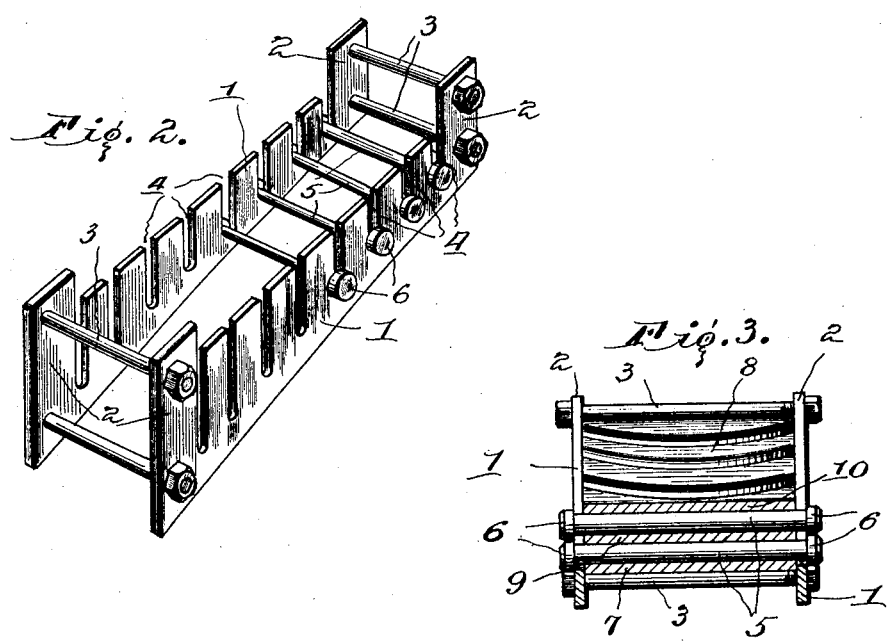
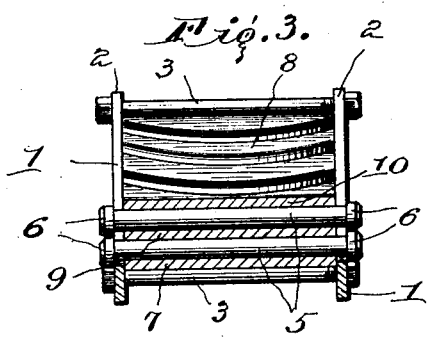
Inventor
Charles C. Carek.
By Donald L. Mapson
Attorney.

UNITED STATES PATENT OFFICE.

CHARLES C. CAREK, OF TOUHY, NEBRASKA.

ANTIFRICTION DEVICE FOR LEAF-SPRINGS.

1,396,251.  Specification of Letters Patent.  Patented Nov. 8, 1921.

Application filed March 30, 1921. Serial No. 456,818.

*To all whom it may concern:*

Be it known that I, CHARLES C. CAREK, a citizen of the United States, residing at Touhy, in the county of Saunders and State of Nebraska, have invented certain new and useful Improvements in Antifriction Devices for Leaf-Springs, of which the following is a specification.

This invention relates to improvements in anti-friction devices for leaf springs, and more particularly to that type of device which will also act as a clip for the spring ends.

An object of the invention is to provide a suitable pair of side plates having a plurality of indentations or sockets therein for the reception of the bearing members which are placed between the spring leaves, thereby lessening the friction which is usual in the leaf type of spring.

Another object of the invention is to provide a suitable anti-friction device for leaf springs, which will be efficient in use and inexpensive to manufacture.

Other objects will appear as the description proceeds.

In the accompanying drawings which constitute a part of my application,

Figure 1 is a side elevation of a portion of a leaf spring with my improved anti-friction device in place thereon;

Fig. 2 is a perspective view of my invention, and

Fig. 3 is a sectional elevation taken on the line 3—3 of Fig. 1.

Like characters of reference are used throughout the several views to designate corresponding parts.

The side plates 1 of my invention are provided with upwardly extending end portions or arms 2, which are connected together by means of the cross bolts 3. Between the end members 2, are a plurality of slots or bearing sockets 4, which are approximately equidistant one from the other.

A plurality of rollers or bearings 5 are inserted in the bearing sockets 4, each of said rollers being provided with headed end portions 6, to limit the lateral movement thereof. These rollers 5 are graduated in size of diameter, from comparatively small diameters at the inner ends of said plates 1, to a considerably larger size at the outer ends of said plates 1, adjacent the end of the spring which is connected to the shackle.

In use, the lower leaf 7 of the spring 8 is spread apart from the second leaf 9, likewise the third leaf 10 is spread away from the second leaf 9, and the anti-friction device placed in position with one set of roller bearings between the first and second leaves, and with a second set of roller bearings between the second and third leaves. Thus, it will be seen that the spread between the several leaves will be even and balanced, due to the graduation of the size and diameter of the roller bearings.

It will furthermore be understood that with this anti-friction device in position, there will be absolutely no need for the usual clips, as the end members 2, when tightened, will hold the several leaves in just the same manner as they would be held if clips were used.

This device, beside being an anti-friction device, will also serve as a shock absorber, as the leaves of the spring are separated in such a manner that the spring action will be much more than were the leaves in contact, one with the other.

Many minor changes in detail of construction may be resorted to without departure from the spirit of the invention.

Having thus described my invention what I claim as new and desire to secure by Letters Patent of the United States is:—

1. An anti-friction device for leaf springs comprising oppositely disposed side plates, said side plates being provided with a plurality of bearing sockets, roller bearings in said sockets, said bearings being graduated in diameter, the smaller bearing being on the inner end and the largest bearing at the outer end of said plates, and means for holding the several parts in assembled position.

2. An anti-friction device for leaf springs comprising oppositely disposed side plates, means connecting said plates at their opposite ends, upwardly extending members formed at the ends of said plates, a plurality of graduated bearings carried by said plates, and means for limiting the lateral movement of said bearings.

3. An anti-friction device for leaf springs comprising oppositely disposed side plates, means connecting said plates at their opposite ends, upwardly extending members formed at the opposite ends of said plates, said plates being provided with a plurality of bearing sockets, bearings graduated in size positioned in said sockets, heads formed on the ends of said bearings for limiting the side movement thereof, and means for holding the several parts in operative position and against displacement.

4. An anti-friction device for leaf springs comprising oppositely disposed plates, a leaf spring positioned within said plates, said plates being provided with a plurality of bearing sockets, a plurality of graduated bearings in said sockets, one row lying between the lowest and second leaf, and a second row of bearings between the second and third leaves, substantially as described.

In testimony whereof I affix my signature.

CHARLES C. CAREK.